UNITED STATES PATENT OFFICE.

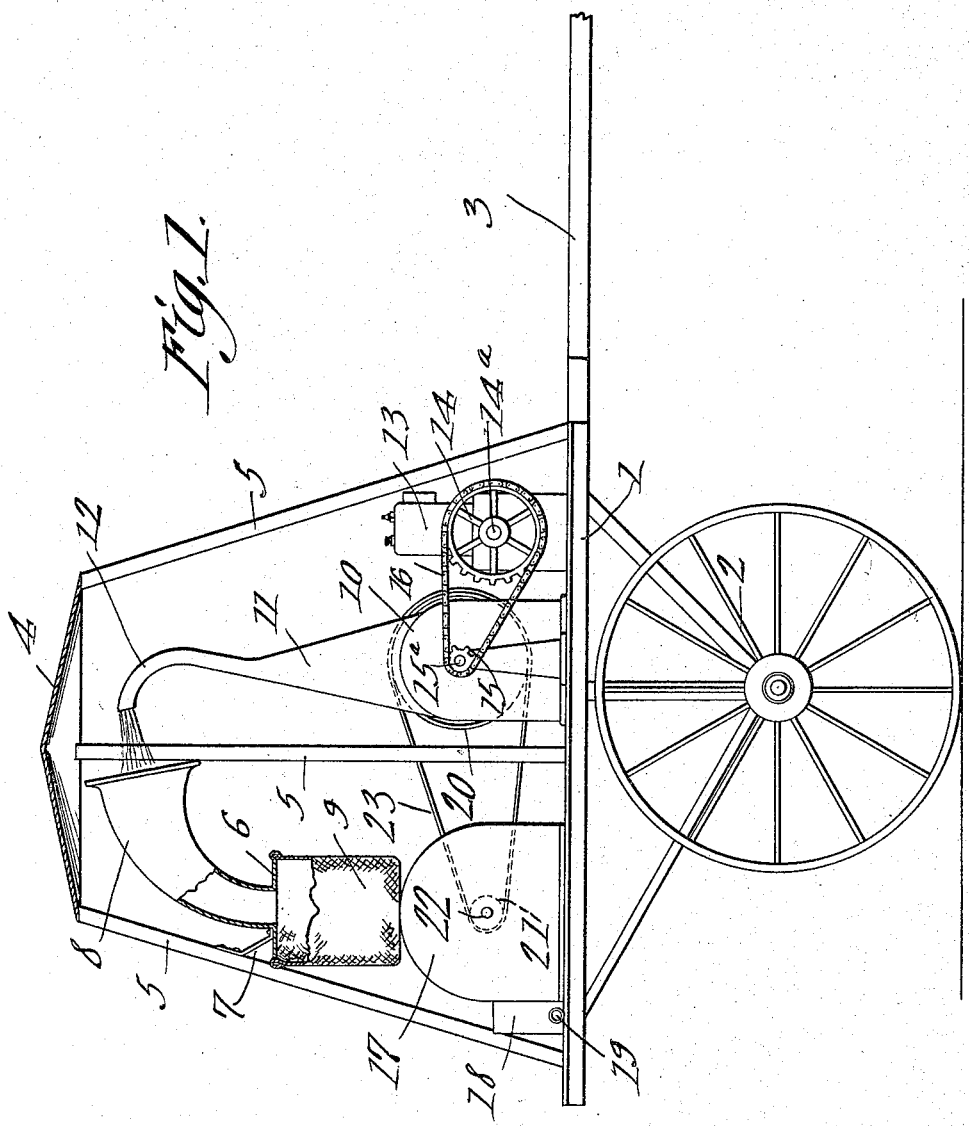

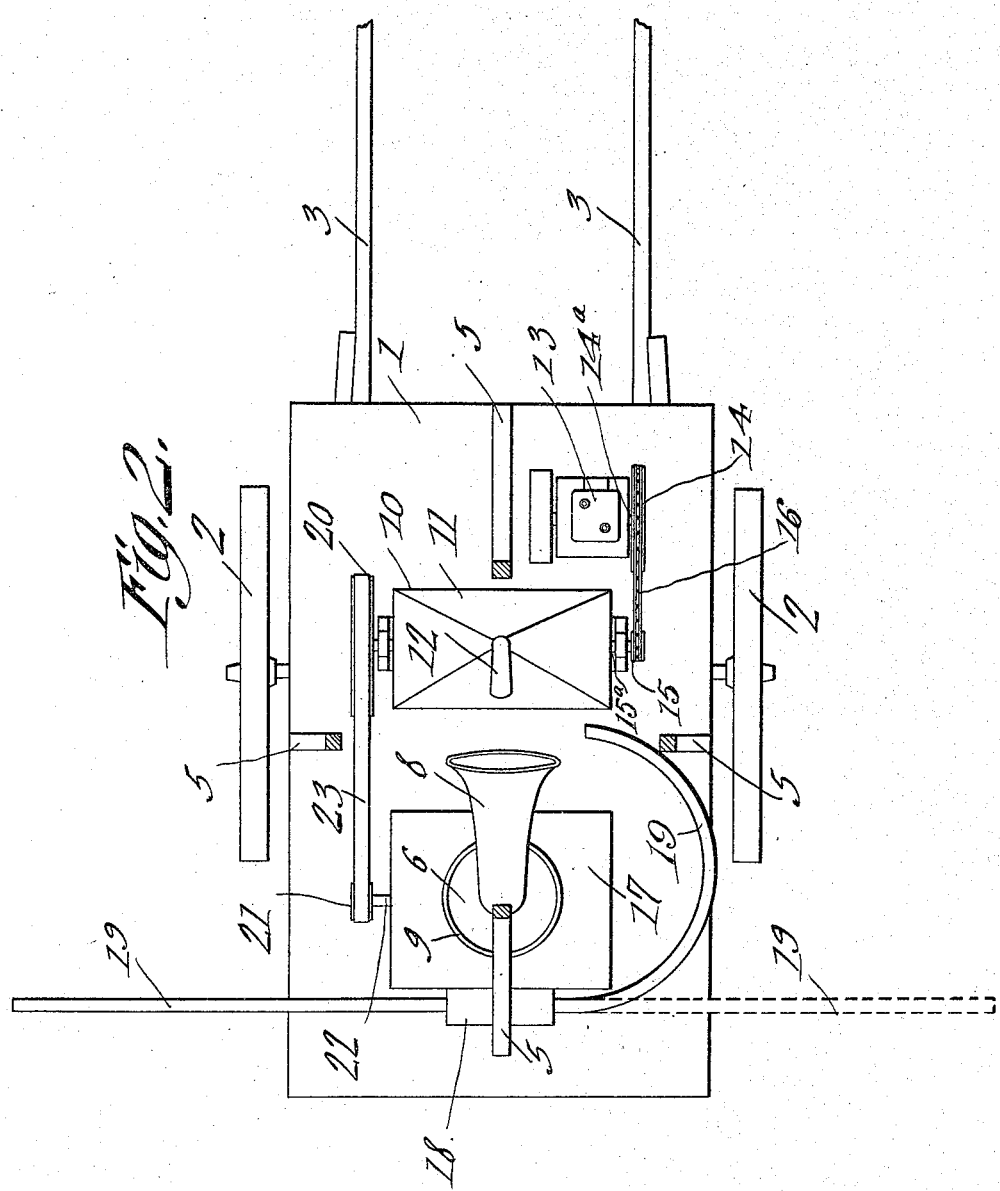

JOHN PRENTICE BERNARD, OF OROSI, CALIFORNIA.

INSECT COLLECTOR AND DESTROYER.

1,174,381.  Specification of Letters Patent.  Patented Mar. 7, 1916.

Application filed April 16, 1915. Serial No. 21,686.

*To all whom it may concern:*

Be it known that I, JOHN P. BERNARD, a citizen of the United States, residing at Orosi, in the county of Tulare and State of California, have invented a new and useful Insect Collector and Destroyer, of which the following is a specification.

The present invention appertains to insect exterminators and aims to provide an insect collector and destroyer of novel and improved construction, and adapted to operate in an efficient manner for catching noxious insects whereby they may be destroyed.

Another object of the invention is the provision of an apparatus which is portable so that it can be drawn or moved along rows of plants or other vegetation and which is operable for collecting the insects in an effective manner.

It is also within the scope of the invention to provide an insect collector and exterminator having the features above noted and which is comparatively simple and inexpensive in construction, as well as being convenient, practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:—

Figure 1 is a side elevation of the improved mechanism, parts being broken away. Fig. 2 is a plan view with parts broken away.

The present mechanism is mounted upon a base 1, which is preferably carried by ground wheels 2, thereby to provide a cart or sulky which enables the apparatus to be readily drawn along or between rows of plants, trees or other vegetation. The base or frame 1 may be provided with shafts 3 between which a horse or other draft animal may be hitched for pulling the cart or sulky. It will be understood, however, that the present apparatus may be rendered portable in any suitable manner, or may be of the stationary type when desired.

Disposed above the base or frame 1, is a conical reflector 4, designed to attract the insects thereunder, the reflector 4 being supported by means of standards 5 attached at their lower ends to the base 1 and having their upper ends attached to the periphery of the reflector. A plate 6 is carried by the rear standard 5 below the rear portion of the reflector 4, the plate 6 being preferably attached to a bracket 7 carried by the rear standard 5, and the plate 6 carries an upwardly and forwardly projecting horn 8. This horn has a flared mouth which opens forwardly, and the horn is tapered from its upper or free end to the plate 6, and serves as a means for catching the insects, as will hereinafter more fully appear, and for directing the insects into a confining compartment or chamber formed by a porous bag 9 hung from the plate 6 and detachably engaged to the periphery or margin of the plate 6 in any suitable manner. The bag 9 is thus carried by the plate 6 to receive the insects which are forced down through the horn 8.

As a means for forcing the insects into and through the horn 8, there is provided a blower 10 mounted upon the base 1 below the forward portion of the reflector 4, and having a funnel-shaped outlet 11 terminating in a goose neck nozzle 12 having its outlet end directed toward the mouth of the horn 8 whereby the stream of air issuing from the nozzle 12 will enter the horn 8. The horn 8 and nozzle 12 are arranged adjacent or immediately below the central portion of the reflector 4 and are spaced apart. The horn 8 catches the stream of air and directs the air downwardly therethrough into the bag or sack 9. The blower 10 may be operated in any suitable manner and as illustrated, is operated by means of an engine or prime mover 13 mounted upon the base 1 in front of the blower 10. The engine and blower are operatively connected by means of a sprocket wheel 14 keyed upon the crank shaft 14$^a$ of the engine, and a sprocket wheel 15 keyed upon the fan shaft 15$^a$ of the blower 10, a sprocket chain 16 being trained around the sprocket wheel. A second blower 17 is carried by the base below the bag 9 and attached to the outlet portion of the blower 17, is a casing 18 containing powdered sulfur or other agent for exterminating the insects and the casing or box 18 has laterally projecting hose sections or flexible tubes 19 through which the fumes are forced. The air being forced from the blower 17 through the casing 18, will become saturated with the sulfur or other insect exterminating agent, and the sulfurized air will be discharged through the tubes to the opposite rows of plants, trees or the like.

The blower 17 is preferably connected to the blower 11, whereby the two blowers will be operated in unison, and to this end a pulley wheel 20 is secured upon the fan shaft 15ª, and a pulley wheel 21 is secured upon the shaft 22 of the blower 17, while a belt 23 is passed around the pulley wheels 20 and 21.

In operation, when the blower 10 is operated it will force the current of air through the nozzle 12 and the stream of air issuing from the nozzle will be directed into and through the horn 8 into the bag 9. The stream of air in entering the horn 8, will create a suction below the reflector 4, and will carry with it the insects which have flown under the reflector, and as a consequence the insects will be forced downwardly through the horn 8 into the collecting bag 9. Since the air continually enters the horn 8, the insects are prevented from escaping from the bag 9, the air escaping out through the pores of the bag 9. The blower 17 being operated will force the sulfurized air or fumes out of the tubes 19 which will exterminate the insects upon the rows of plants or other vegetation, or will chase the insects from the plants and they will be attracted by the reflector 4, so that when the insects pass under the reflector 4, they will be caught up by the air suction and carried into the bag 9. Thus, as the cart or vehicle is drawn along, it will effectively collect the insects, and the insects within the bag 9 may be exterminated in any desired manner. Thus, the sulfur fumes issuing from one of the tubes 19 may be directed in front of the horn 8 by bending the respective tube toward said horn, so as to be drawn into the bag 9 with the air, and this will serve to kill the insects, although any other suitable means may be employed to this end.

Having thus described the invention, what is claimed as new is:—

1. An insect collector comprising an upper reflector, a confining chamber having a curved inlet horn projecting upwardly under said reflector, and a blower having an outlet nozzle projecting upwardly under said reflector and toward the mouth of the horn.

2. In a device of the character described, a confining chamber having an inlet, a blower having an outlet nozzle directed toward said inlet, a second blower, fume generating means communicating with the outlet of the second blower, and a flexible outlet tube for said means and bendable to direct the fumes to said inlet of the confining chamber.

In testimony that I claim the foregoing as my own, I have hereto affixed my signature in the presence of two witnesses.

JOHN PRENTICE BERNARD.

Witnesses:
 CHARLES A. EVANS,
 HARRY N. ANDREWS.

Copies of this patent may be obtained for five cents each, by addressing the "Commissioner of Patents, Washington, D. C."